United States Patent
Kim et al.

(10) Patent No.: US 12,340,280 B1
(45) Date of Patent: Jun. 24, 2025

(54) SYSTEMS AND METHODS FOR REDUCING FALSE POSITIVE ERROR RATES USING IMBALANCED DATA MODELS

(71) Applicant: Allstate Insurance Company, Northbrook, IL (US)

(72) Inventors: Jin Kim, Rolling Meadows, IL (US); Mihaela Marcusanu, Deerfield, IL (US)

(73) Assignee: Allstate Insurance Company, Northbrook, IL (US)

( * ) Notice: Subject to any disclaimer, the term of this patent is extended or adjusted under 35 U.S.C. 154(b) by 174 days.

(21) Appl. No.: 16/678,412

(22) Filed: Nov. 8, 2019

(51) Int. Cl.
*G06N 20/00* (2019.01)
*G06N 3/126* (2023.01)

(52) U.S. Cl.
CPC ............. *G06N 20/00* (2019.01); *G06N 3/126* (2013.01)

(58) Field of Classification Search
CPC ........ G06N 20/00; G06N 20/10; G06N 20/20; G06N 5/00; G06N 5/02; G06N 5/04; G06N 3/126
See application file for complete search history.

(56) References Cited

U.S. PATENT DOCUMENTS

| | | |
|---|---|---|
| 6,330,546 B1 | 12/2001 | Gopinathan et al. |
| 6,941,287 B1 | 9/2005 | Vaidyanathan et al. |
| 7,480,640 B1 | 1/2009 | Elad et al. |
| 7,627,620 B2 | 12/2009 | Campos et al. |
| 7,756,804 B2 | 7/2010 | Bloom et al. |
| 8,015,239 B2 | 9/2011 | Sharma et al. |
| 8,036,996 B2 | 10/2011 | Long et al. |
| 8,065,233 B2 | 11/2011 | Lee et al. |
| 8,417,715 B1 | 4/2013 | Bruckhaus et al. |
| 8,515,862 B2 | 8/2013 | Zhang et al. |
| 8,688,603 B1 | 4/2014 | Kurup et al. |
| 8,972,307 B1 | 3/2015 | Servedio et al. |
| 9,082,083 B2 | 7/2015 | Virkar et al. |

(Continued)

FOREIGN PATENT DOCUMENTS

KR 20180120056 A 11/2018

OTHER PUBLICATIONS

Hordri et al. "Handling Class Imbalance in Credit Card Fraud using Resampling Methods", 2018 https://www.researchgate.net/profile/Nur-Hordri/publication/329418254_Handling_Class_Imbalance_in_Credit_Card_Fraud_using_Resampling_Methods (Year: 2018).*

(Continued)

*Primary Examiner* — Kamran Afshar
*Assistant Examiner* — Lokesha G Patel
(74) *Attorney, Agent, or Firm* — Akerman LLP

(57) ABSTRACT

As described herein, a base model based on imbalanced data may be selected for a machine learning process associated with a specific application. A first false positive error rate may be generated based on the selected base model. A plurality of imbalanced data sets may be generated based on the imbalanced data associated with the base model. A plurality of models may be generated based on the generated plurality of imbalanced data sets. A subset of the outputs of the plurality of models may be ensembled and a second false positive error rate may be generated based on the ensembled output of the subset of the plurality of models. The second false positive error rate may be determined to be less than the first false positive error rate.

24 Claims, 12 Drawing Sheets

(56) References Cited

U.S. PATENT DOCUMENTS

| | | | |
|---|---|---|---|
| 9,508,075 | B2 | 11/2016 | Geckle et al. |
| 11,182,691 | B1* | 11/2021 | Zhang .................... G06N 20/00 |
| 2008/0133434 | A1 | 6/2008 | Asar et al. |
| 2009/0089244 | A1* | 4/2009 | Donato ................. G06Q 10/10 |
| 2016/0162802 | A1 | 6/2016 | Chickering et al. |
| 2018/0210944 | A1* | 7/2018 | Sukhanov ............. G06F 16/285 |
| 2019/0213605 | A1* | 7/2019 | Patel ....................... G06N 5/048 |
| 2020/0372383 | A1* | 11/2020 | Cao ........................ G06N 20/00 |
| 2020/0387797 | A1* | 12/2020 | Ryan .................. G06F 11/3409 |

OTHER PUBLICATIONS

Bennin et al. "On the relative value of data resampling approaches for software defect prediction", 2018 https://link.springer.com/content/pdf/10.1007/s10664-018-9633-6.pdf (Year: 2018).*

Poolsawad et al. "Balancing Class for Performance of Classification with a Clinical Dataset", 2014 https://www.researchgate.net/profile/Chandra-Kambhampati/publication/288795645_Balancing_Class_for_Performance_of_Classification_with_a_Clinical_Dataset (Year: 2014).*

Roy Wedge et al. "Solving the false positives problem in fraud prediction using automated feature engineering" https://link.springer.com/chapter/10.1007/978-3-030-10997-4_23 websited visited Oct. 29, 2019, pp. 1-16.

Matt Kuhn "The caret Package" https://topepo.github.io/caret/index.html, May 26, 2018 pp. 1-9.

Ben Rogojan "Boosting and Bagging: How To Develop A Robust Machine Learning Algorithm" Better Programming https://medium.com/better-programming/how-to-develop-a-robust-algorithm-c38e08f32201 Nov. 21, 2017, pp. 1-9.

Michael Manapat "A primer on machine learning for fraud detection" Stripe https://stripe.com/radar/guide website visited Oct. 29, 2019, pp. 1-21.

Aleksander Kijek "A Beginner's Guide to Machine Learning in Payment Fraud Detection & Prevention" Nethone https://nethone.com/blog/beginners-guide-to-machine-learning/ Aug. 18, 2017, pp. 1-8.

"How Machine Learning Facilitates Fraud Detection?" Maruti Techlabs https://marutitech.com/machine-learning-fraud-detection/ website visited Oct. 29, 2019, pp. 1-13.

* cited by examiner

| Data_50/50, Model_50/50 | | | | | | | | | |
|---|---|---|---|---|---|---|---|---|---|
| Sim | f1 | precision | recall | TP | FP | FN | TN | thresh | ones_percent | FPER |
| 1 | 0.428726 | 0.927617 | 0.278788 | 15071 | 1176 | 38988 | 53041 | 0.8402 | 15.01% | 7.24% |
| Data_70/30, Model_70/30 | | | | | | | | | |
| Sim | f1 | precision | recall | TP | FP | FN | TN | thresh | ones_percent | FPER |
| 2 | 0.342852 | 0.972787 | 0.208097 | 15800 | 442 | 60126 | 31908 | 0.94755 | 15.00% | 2.72% |
| Data_76/24, Model_76/24 | | | | | | | | | |
| Sim | f1 | precision | recall | TP | FP | FN | TN | thresh | ones_percent | FPER |
| 3 | 0.319551 | 0.973406 | 0.191151 | 15812 | 432 | 66908 | 25124 | 0.94874 | 15.00% | 2.66% |
| Data_80/20, Model_80/20 | | | | | | | | | |
| Sim | f1 | precision | recall | TP | FP | FN | TN | thresh | ones_percent | FPER |
| 4 | 0.309911 | 0.982334 | 0.183976 | 15959 | 287 | 70786 | 21244 | 0.97258 | 15.00% | 1.77% |
| Data_90/10, Model_90/10 | | | | | | | | | |
| Sim | f1 | precision | recall | TP | FP | FN | TN | thresh | ones_percent | FPER |
| 5 | 0.281667 | 0.985964 | 0.164302 | 16016 | 228 | 81463 | 10569 | 0.988805 | 15.00% | 1.40% |

FIG. 7

| Data_76/24, Model_50/50 | | | | | | | | | |
|---|---|---|---|---|---|---|---|---|---|
| Sim | f1 | precision | recall | TP | FP | FN | TN | thresh | ones_percent | FPER |
| 6 | 0.319213 | 0.972479 | 0.190945 | 15795 | 447 | 66925 | 25109 | 0.8617 | 15.00% | 2.75% |

| Data_76/24, Model_70/30 | | | | | | | | | |
|---|---|---|---|---|---|---|---|---|---|
| Sim | f1 | precision | recall | TP | FP | FN | TN | thresh | ones_percent | FPER |
| 7 | 0.318924 | 0.971497 | 0.190776 | 15781 | 463 | 66939 | 25093 | 0.93306 | 15.00% | 2.85% |

| Data_76/24, Model_76/24 | | | | | | | | | |
|---|---|---|---|---|---|---|---|---|---|
| Sim | f1 | precision | recall | TP | FP | FN | TN | thresh | ones_percent | FPER |
| 8 | 0.319551 | 0.973406 | 0.191151 | 15812 | 432 | 66908 | 25124 | 0.94874 | 15.00% | 2.66% |

| Data_76/24, Model_80/20 | | | | | | | | | |
|---|---|---|---|---|---|---|---|---|---|
| Sim | f1 | precision | recall | TP | FP | FN | TN | thresh | ones_percent | FPER |
| 9 | 0.319011 | 0.971863 | 0.190825 | 15785 | 457 | 66935 | 25099 | 0.959109 | 15.00% | 2.81% |

| Data_76/24, Model_90/10 | | | | | | | | | |
|---|---|---|---|---|---|---|---|---|---|
| Sim | f1 | precision | recall | TP | FP | FN | TN | thresh | ones_percent | FPER |
| 10 | 0.318948 | 0.971619 | 0.190788 | 15782 | 461 | 66938 | 25095 | 0.981337 | 15.00% | 2.84% |

FIG. 9

| Ensemble of (0.25*Sim_7_pred + 0.5*Sim_8_pred + 0.25*Sim_9_pred) | | | | | | | | | | |
|---|---|---|---|---|---|---|---|---|---|---|
| Sim | f1 | precision | recall | TP | FP | FN | TN | thresh | ones_percent | FPER |
| 11 | 0.319739 | 0.97408 | 0.19126 | 15821 | 421 | 66899 | 25135 | 0.9466 | 15.00% | 2.59% |

FIG. 11

SYSTEMS AND METHODS FOR REDUCING FALSE POSITIVE ERROR RATES USING IMBALANCED DATA MODELS

TECHNICAL FIELD

The present disclosure relates to systems and methods for machine learning. In particular, various aspects of the disclosure include reducing false positive error rates using imbalanced data models.

BACKGROUND

Computational learning or machine learning is about computer programs or algorithms that automatically improve their performance through experience over time. Machine learning algorithms can be exploited for automatic performance improvement through learning in many fields including, for example, insurance claims processing, fraud detection, planning and scheduling, bio-informatics, natural language processing, information retrieval, speech processing, behavior prediction, and face and handwriting recognition.

Machine learning process is a method for analyzing data. A set of input data (also referred to as independent variables) is mapped to the model output data (dependent variables) via known functions or rules. One type of machine learning is supervised learning, which comprises using a set of known data for the output data of a sufficient number of input data to train the model. Once the model is trained, it can be deployed, that is, applied to the new input data to predict the desired output.

An approach to developing useful machine learning algorithms is based on statistical modeling of data. With a statistical model in hand, probability theory and decision theory can be used to develop machine learning algorithms. Statistical models that are commonly used for developing machine learning algorithms may include, for example, regression, neural network, linear classifier, support vector machine, Markov chain, and decision tree models. This statistical approach may be contrasted to other approaches in which training data is used merely to select among different algorithms or to approaches in which heuristics or common sense is used to design an algorithm.

A goal of generating models used in machine learning is to be able to predict the value of a random variable y from a measurement x (e.g., predicting the value of engine efficiency based on a measurement of oil pressure in an engine). The machine learning processes may involve statistical data resampling techniques or procedures such as bootstrapping, bagging, and boosting, which allow extraction of additional information from a training data set.

An important performance metric for models used in machine learning is the false positive error rate (FPER). The FPER is the rate at which a test result incorrectly indicates that a particular condition or attribute is present. There is a desire to generate new modeling techniques for reducing FPER's in machine learning processes or computer automated systems.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

One example method may include: receiving, by a computing device having one or more processors and a memory, a first data set having a first sampling ratio and generating a first model based on the first data set and the first sampling ratio. The first data set may comprise test data associated with a large data set size based on a large number of observations. The first sampling ratio may comprise a ratio of positive target data points to negative target data points in the first data set. A first output data may be generated by applying, as an input, the received first data set to the generated first model. The computing device may generate a first false positive error rate based on the first output data set and a predefined data set. A plurality of models may be generated by resampling the first data set according to different sampling ratios and creating corresponding models. A plurality of output data sets may be generated by applying, as an input, the received first data set to each of the generated models, of the plurality of models. A combined output data set may be generated by computing a weighted average of a combination of the first output data set and a subset of the plurality of output data sets. The computing device may generate a second false positive error rate based on the combined output data set and the predefined data set and determine that the second false positive error rate is less than the first false positive error rate.

In accordance with other embodiments of the present disclosure, another example method comprises: receiving, by a computing device having one or more processors and a memory, a first data set having a first sampling ratio. The first data set may be resampled to generate a plurality of data sets with different sampling ratios. A base model may be generated based on the first data set and the first sampling ratio. A plurality of models, with corresponding sampling ratios, may be generated based on the generated plurality of data sets with different sampling ratios. A plurality of output data sets may be generated by applying, as a data input, the first data set, to the generated base model and each model, of the generated plurality of models. The computing device may generate a plurality of false positive error rates based on each output data set, of the generated plurality of output data sets, and a predefined data set. A best model may be selected, from the base model and the generated plurality of models, by determining a minimum value of the generated plurality of false positive error rates. An ensembled output data set may be generated by computing a weighted average of a combination of the output data set associated with the best model and the output data sets associated with a subset of the generated plurality of models. The computing device may generate a new false positive error rate based on the ensembled output data set and the predefined data set. The computing device may determine that the new false positive error rate associated with the ensembled output data set is less than the determined minimum value of the generated plurality of false positive error rates.

In accordance with other embodiments of the present disclosure, an example system comprises: one or more processors; memory storing computer-executable instructions that, when executed by the one or more processors, cause the system to: receive, by a computing device having one or more processors and a memory, a first data set having a first sampling ratio. The one or more processors may generate a first model based on the first data set and the first sampling ratio. A first output data set may be generated by applying, as an input, the received first data set to the first model. The one or more processors may compute a first false positive error rate based on the first output data set and a predefined data set. A plurality of models may be generated, wherein each generated model is based on resampling the first data set. A plurality of output data sets may be generated by applying, as an input, the received first data set to each of the generated models, of the plurality of models. The system may generate a combined output data set by computing a weighted average of a combination of the first output data set and a subset of the plurality of output data sets. A second false positive error rate may be computed based on the combined output data set and the predefined data set. The one or more processors may determine that the second false positive error rate is less than the first false positive error rate.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 7 illustrates an example table diagram showing FPER simulation results based on the training of models using corresponding imbalanced data sets in accordance with one or more aspects described herein.

FIG. 9 illustrates an example table diagram showing FPER simulation results based on the base imbalanced data set applied to the plurality of models in accordance with one or more aspects described herein.

FIG. 11 illustrates an example table diagram showing FPER simulation results based on the ensembled outputs of the plurality of models in accordance with one or more aspects described herein.

DETAILED DESCRIPTION

In the following description of the various embodiments, reference is made to the accompanying drawings, which form part hereof, and in which is shown by way of illustration, various embodiments of the disclosure that may be practiced. It is to be understood that other embodiments may be utilized.

Figure 1:
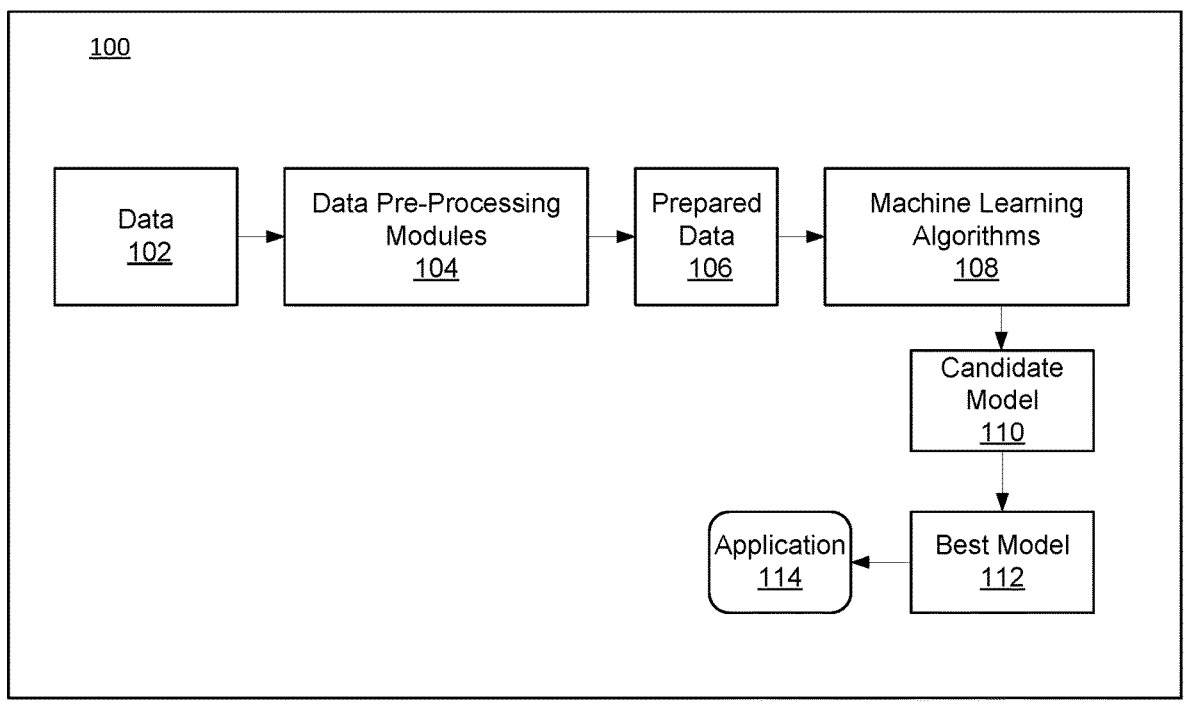
FIG. 1 illustrates an example schematic of a machine learning process in accordance with one or more aspects described herein.

FIG. 1 illustrates an example schematic of a machine learning process 100 that may be used according to one or more illustrative arrangements of the disclosure. The machine learning process 100 begins with data 102 that has not been processed. The more data 102 used in the machine learning process 100, the better (e.g., more accurate) the results. Choosing the right data to work with is one aspects of the machine learning process. For example, data used to detect credit card fraud may include a customer's age, country in which the credit card may have been issued, and the places the credit card may have been used. Additional data, such as the time of day the card may have been used, the kind of establishment it may have been used in, and maybe even the weather at the time of use, may also be relevant. Determining the most relevant data 102 to use in the machine learning process 100 is a fundamental part of the process.

The machine learning process 100 may also comprise various data pre-processing modules 104. The data-preprocessing modules 104 process the input data 102 to generate a prepared data 106 that can be used as an input data set to a machine learning algorithm 108. For example, in credit card fraud detection, the raw data 102 may contain duplicate entries for some customers, and perhaps with conflicting information. The raw data 102 may lack information about where some credit cards may have been issued or used. The data pre-processing module 104 may create prepared data 106 by processing to the raw data 102 over several iterations. The prepared data 106 may be a balanced or an imbalanced data set. A balanced data set may comprise equal amounts of logical 1 and logical zero target data values. An imbalanced set may comprise an uneven distribution of logical one and logical zero data values.

After the machine learning process 100 may have generated the prepared data 106, it determines the best way to solve a specific application problem (e.g., detecting credit card fraud) by generating machine learning algorithms 108 to analyze the prepared data 106. These machine learning algorithms 108 typically apply some statistical analysis to the data. Examples of analyses that may be performed by the machine learning algorithm may include regression, two-class boosted decision tree, and multiclass decision jungle. The results of the application of the machine learning algorithm 108 to prepared data 106 may be analyzed, in an iterative manner, to determine what combination of the machine learning algorithm 108 and prepared data 108 may be used.

For example, if the goal is to determine whether a credit card transaction is fraudulent, the parts of the prepared data 106 and machine learning algorithm 108 may be likely to accurately predict this application are chosen. The machine learning algorithm 108 applied to prepared data 106 generates a candidate model 110. The candidate model 110 represents the implementation of an algorithm for recognizing a pattern (e.g., determining whether a credit card transaction is fraudulent). The candidate model 110 returns a probability between 0 and 1. For example, if a credit card fraud model returns a probability of 0.9, this will likely result in the transaction being marked as fraudulent, while a probability of 0.1 will let the transaction be processed normally.

The initially generated candidate model 110 may not be the best model for the application. A variety of different combinations of machine learning algorithms 108 and prepared data 106 may be executed to determine and select a best model 112. The selection of a best model may be an iterative process that is based on determining a model that produces the most accurate results corresponding to the minimum amount of errors. After a best model 112 has been selected, the machine learning algorithms 108 representing the best model 112 may be used in applications 114 to detect and/or recognize patterns. The best model 112 may be based on balanced or imbalanced data. The balanced or imbalanced data may be resampled to generate a plurality of new models.

Figure 2:
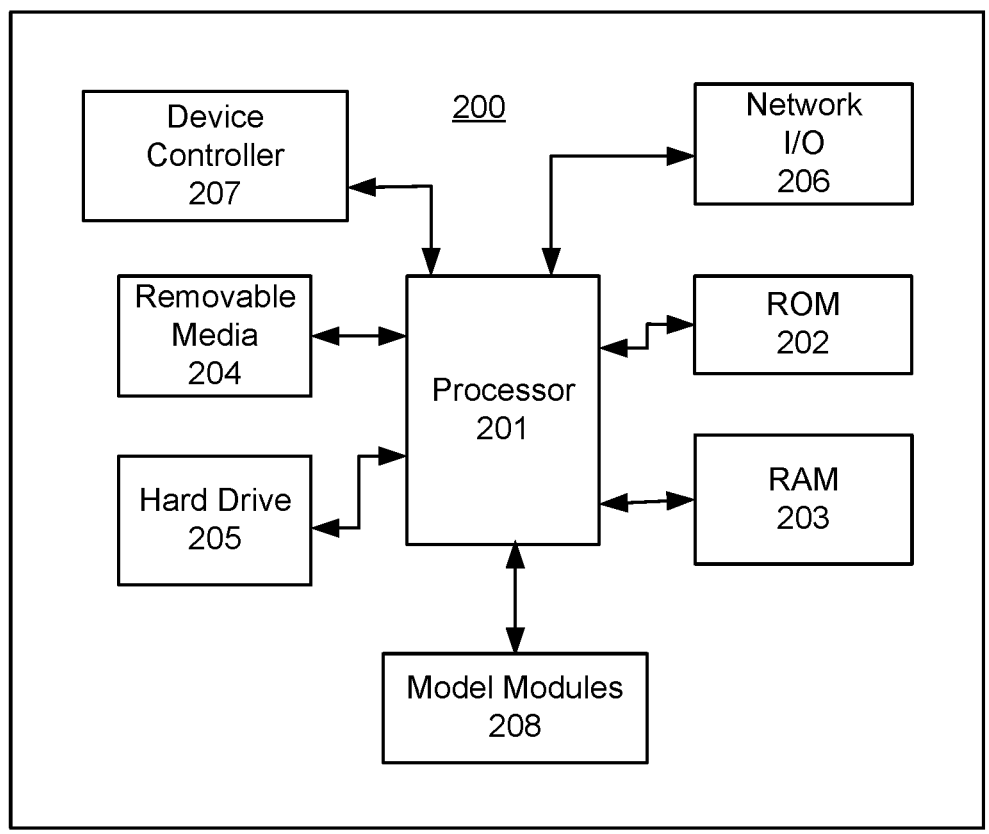
FIG. 2 illustrates an example computing device that may implement a machine learning process based on imbalanced data modeling in accordance with one or more aspects described herein.

FIG. 2 illustrates an example computing device 200 that may implement a machine learning process based on imbalanced data models. According to some embodiments computing device 200 could be used to implement one or more components of process 100. For example, computing device 200 could be used to implement one or more of the data pre-processing modules 104, machine learning algorithm 108, and the candidate and best models 110, 112 depicted in FIG. 1. The computing device 200 may be configured to execute the instructions used in the implementation of the model modules 208 which may also include machine learning algorithms used to generate a candidate 110 or best model 112. As shown in FIG. 2, computing device 200 includes a processor 201, a memory comprising a read only memory, ROM 202, and a random-access memory, RAM 203. The computing device 200 also includes a storage device comprising a hard drive 205 and removable media 204. Further, the computing device 200 also has a device controller 207 and a network input/output (network I/O) interface 206. Each of the processor 201, ROM 202, RAM 203, hard drive 205, removable media 204, device controller 207, and network I/O 206, are interconnected using various buses, and may be mounted on a common motherboard or in other manners as appropriate.

The processor 201 can process instructions from the model modules 208 for execution within the computing device 200, including instructions stored in ROM 202 and RAM 203 or in the hard drive 205 and removable media 204. In other implementations, multiple processors and/or multiple buses may be used, as appropriate, along with multiple memories. Also, multiple computers may be connected, with each device providing portions of the necessary operations, to form a multi-processor system.

The memory which comprises ROM 202 and RAM 203 stores information within the computing device 200. In some implementations the memory is a volatile memory. In other implementations, the memory is a non-volatile memory. The memory may also be another form of computer-readable medium, such as a magnetic or optical disk.

The storage which comprises the hard drive 205 and the removable media 204 can provide mass storage for the computing device 200. The removable media may contain a computer readable medium, such as a floppy disk device, a hard disk device, an optical disk device, a tape device, a flash memory or other similar solid-state memory device, or an array of devices, including devices in a storage area network or other configurations.

The instructions used in executing the model modules 208 can be stored in an information carrier. The instructions when executed by one or more processing devices (for example, processor 201), perform the method as described above. The instructions can also be stored by one or more storage devices such as ROM 202, RAM 202, hard drive 205, or removable media 204.

The device controller 207 is a part of a computing device 200 that controls the signals going to and coming from the processor 201. The device controller 207 uses binary and digital codes. The device controller 207 has a local buffer and a command register and communicates with the processor 201 by interrupts. The network I/O 206 is used to allow the computing device 200 to access information on a remote computer or server. The device controller 207 functions as a bridge between devices connected to the computing device 200, such as the network I/O 206 interface and the processor 201.

Figure 3:
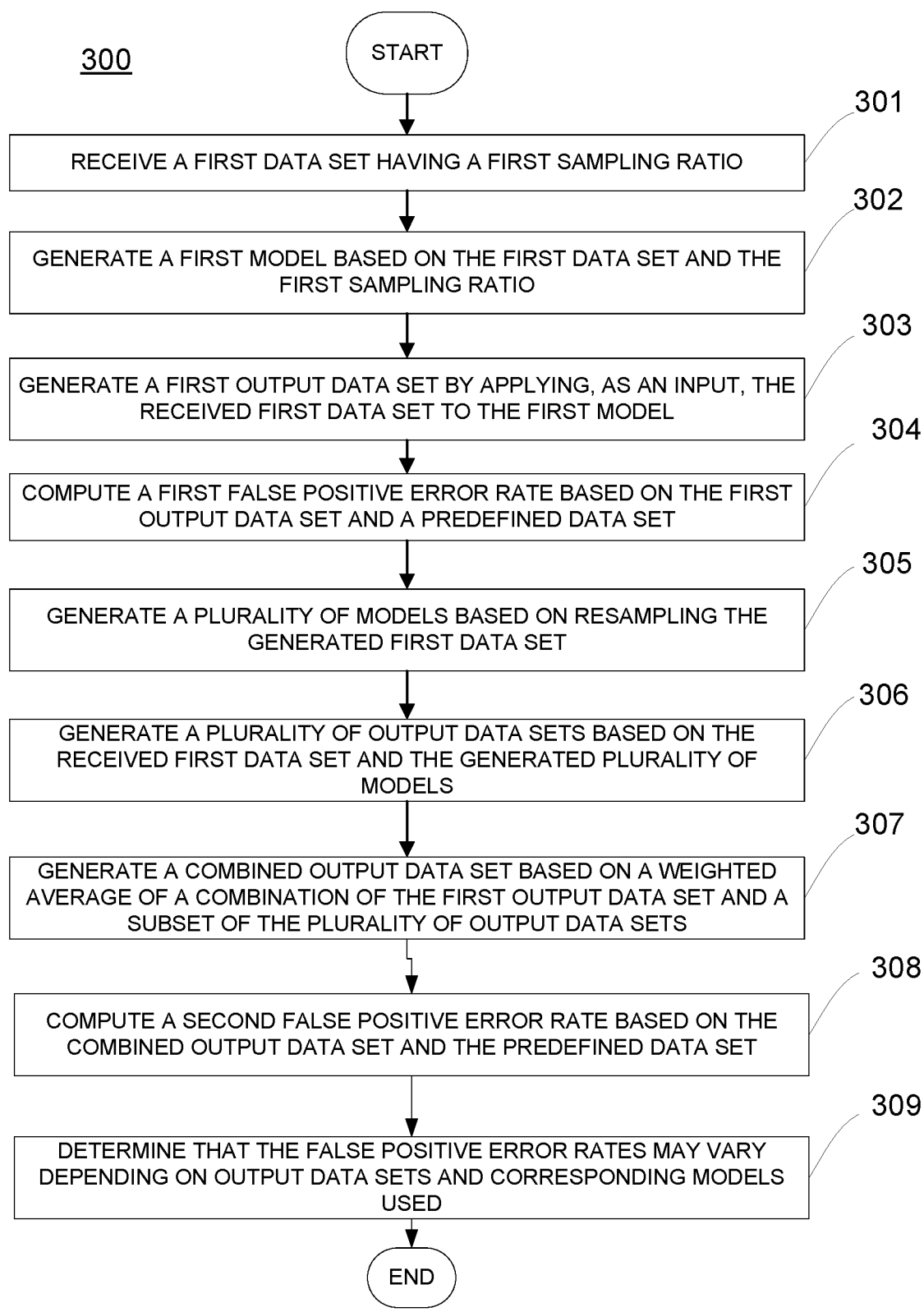
FIG. 3 illustrates a flow chart showing an example method for reducing FPERs based on data models generated from imbalanced data sets in accordance with one or more aspects described herein.

FIG. 3 illustrates a flow chart showing an example method 300 for reducing FPERs based on imbalanced data models by executing a set of instructions comprising the initial step of receiving a first data set having a first sampling ratio 301. The received first data set may be an imbalanced data set that is used to build a predictive model. The first data set may comprise an uneven distribution of binary target values of ones and zeros representing the first sampling ratio. For example, the first data set may comprise an imbalanced binary distribution with 76% target one values and 24% target zero values as opposed to a balanced data set of 50% target one values and 50% target zero values. The next steps involve generating a first model based on the first data set 302 and the first sampling ratio and generating a first output data set by applying, as an input, the received first data set to the first model 303.

The generated first model may be based on an imbalanced data set with the same sampling ratio as the first data set. The next steps involve computing a first false positive error rate based on the first output data set and a predefined data set 304 and generating a plurality of models. The first false positive error rate may be obtained by initially creating a confusion matrix for binary classification based on predicted values and actual data values. Further, the first false positive error rate may be calculated using the following equation: FPER=FP/(TP+FP), where FP is the number of false positives and TP is the number of true positives. Reducing the FPER in machine learning processing is important because a false positive error may incur some financial cost or other penalty and it is generally desired to maintain a low false positive error rate (FPER) while keeping a high number of true positives (TP). The first data set may be resampled by upsampling or downsampling to generate new data sets with different sampling ratios. A set of models may be generated based on imbalanced data sets, with different corresponding sampling ratios 305. The sampling ratios associated with the newly generated set of imbalanced models are uneven (e.g. 80/20, 70/30, etc.).

The next steps involve generating a plurality of new data sets based on resampling the generated first data set 306. The sampling ratios of the generated new data sets may be different from the sampling ratio of the first data set. A plurality of new models may be generated based on the generated new data sets. A plurality of output data sets may be generated by applying, as an input, each new data set, of the generated plurality of new data sets, to each corresponding new model, of the generated plurality of new models 307.

A plurality of false positive error rates may be generated based on the generated plurality of output data sets and a predefined data set 308. The generated plurality of false positive error rates may vary depending on the generated plurality of output data sets and the corresponding model used 309. For example, in one instance, the generated plurality of false positive error rates may be compared to the first false positive error rate and it may be determined that the generated plurality of false positive error rates decreases as the sampling ratio, associated with a corresponding data set and model, increases. In other instances, the generated plurality of false positive error rates may vary in an alternative manner.

Figure 4:
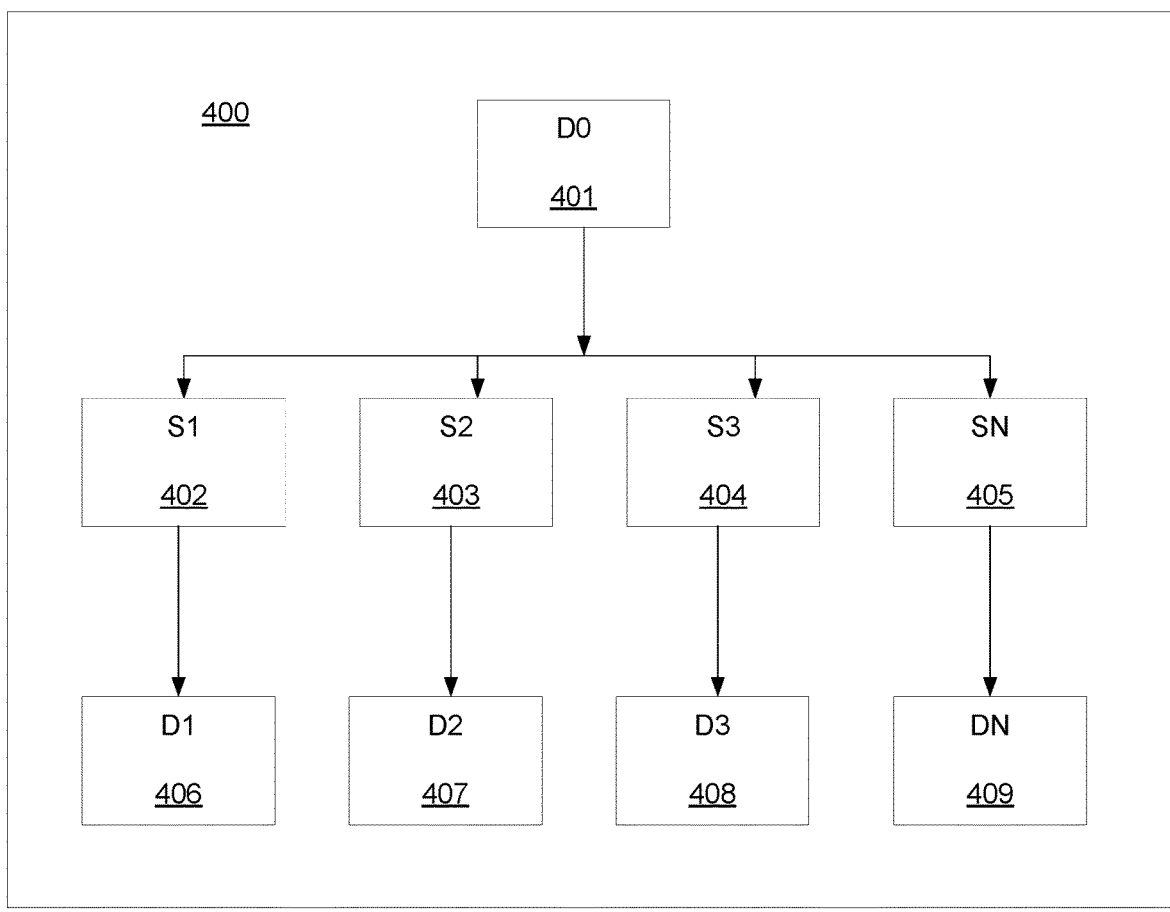
FIG. 4 illustrates an example schematic showing the generation of a plurality of imbalanced data sets from a base imbalanced data set in accordance with one or more aspects described herein.

FIG. 4 illustrates an example schematic 400 showing the generation of a plurality of imbalanced data sets from a base imbalanced data set D0 401. FIG. 4 comprises a base imbalanced data set D0 401 used to create imbalanced base model M0 501 (shown in FIG. 6). A sampler S1 402 may be used to generate an imbalanced data set D1 406. Samplers S2 403, S3 404, and SN 405 may be used to generate imbalanced data sets D2 407, D3 408, and DN 409. The sampling ratios used in samplers S1 402, S2 403, S3 404, and SN 405 may be uneven and have different distribution binary profiles (e.g. S1 may be 80/20, S2 may be 90/10, S3 may be 70/30, and SN may be 60/40). The imbalanced data sets D2 407, D3 408, and DN 409 may be generated by upsampling or downsampling the base imbalanced data set D0 401.

Figure 5:
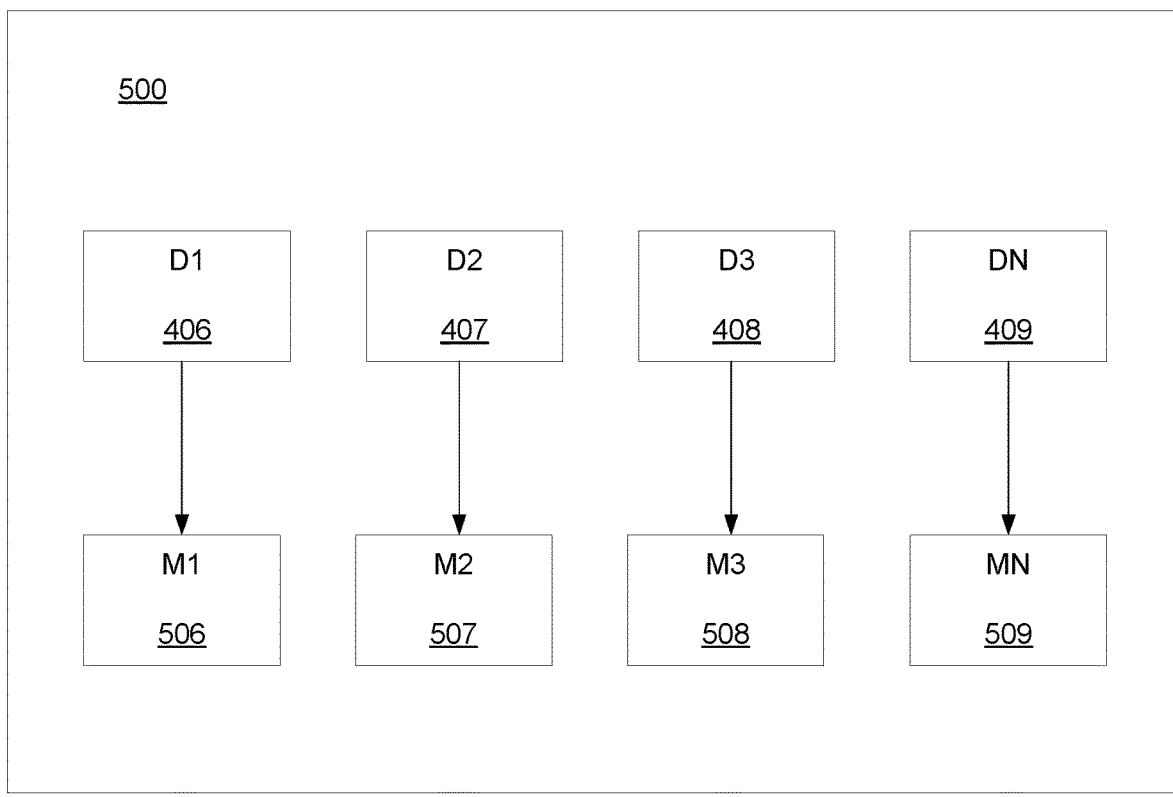
FIG. 5 illustrates an example schematic showing the generation of a plurality of models based on a plurality of imbalanced data sets in accordance with one or more aspects described herein.

FIG. 5 illustrates an example schematic 500 showing the generation of a plurality of models (M1, M2, M3, and MN) based on the generated plurality of data sets (D1, D2, D3, and DN). FIG. 5 comprises the generation of model M1 506 based on the imbalanced data set D1 406. The sampling ratio of the generated model M1 506 corresponds to the sampling ratio of data set D1 406. Similarly, model M2 507 may be generated based on the imbalanced data set D2 407 . . . . Similarly, model M3 508 may be generated based on the imbalanced data set D3 408. Similarly, model MN 509 may be generated based on the imbalanced data set DN 409.

Figure 6:
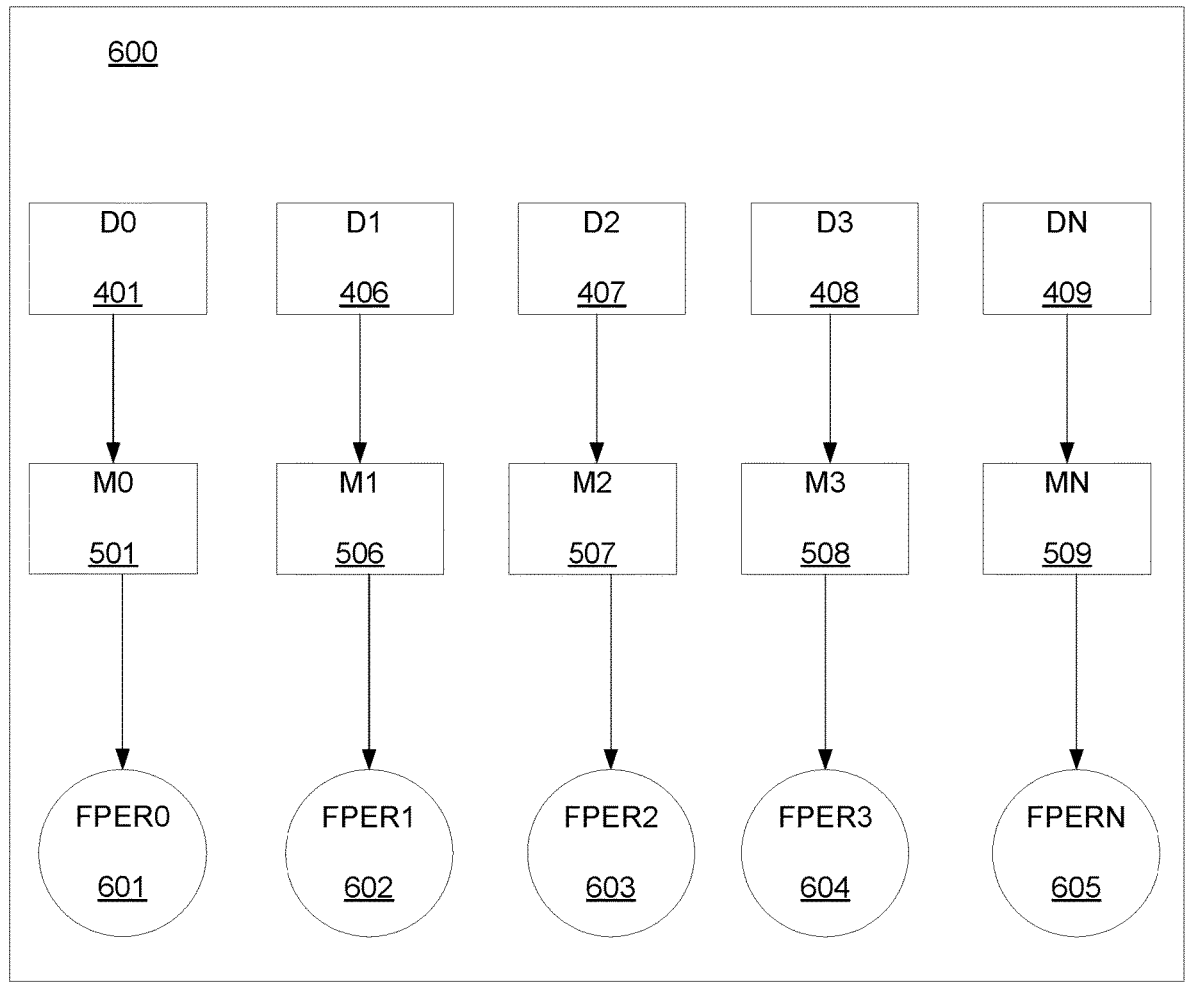
FIG. 6 illustrates an example schematic showing the training of models using corresponding imbalanced data sets in accordance with one or more aspects described herein.

FIG. 6 illustrates an example schematic 600 showing the training of a plurality of models using corresponding imbalanced data sets. The base model M0 501 and the generated models (M1 506, M2 507, M3 508, MN 509) may be trained by applying the corresponding generated imbalanced data set (i.e. D0 401 is applied to M0 501, D1 406 is applied to M1 506, etc.) as an input and calculating a corresponding FPER (i.e. FPER0 601 for model M0 501, FPER1 602 for model M1 506, FPER2 603 for model M2 506, etc.).

FIG. 7 illustrates an example table diagram showing FPER simulation results based on the training of models using corresponding imbalanced data sets. FIG. 7 comprises 11 columns and a total of 5 simulations. The simulations represent the training of models with corresponding imbalanced data sets. The sampling ratios used in the simulation include 70/30, 76/24, 80/20, and 90/10. However, other sampling ratios may be used without departing from the invention. The imbalanced data set with sampling ratio 76/24 corresponds to the base data set. The model corresponding to the imbalanced data set with a sampling ratio of 76/24 corresponds to the base model. The simulations also include a balanced model with a 50/50 sampling ratio for comparison. It may be observed that the resampled data varies as the data set changes from data_50/50 to data_90/10 and the number of true positives (TP) goes up while the number of false positives (FP) goes down. It may also be observed that the number of false negatives (FN) increases and the number of true negatives (TN) decreases correspondingly. This is reflected by the precision getting better while the recall gets worse corresponding to a worse F1 score. Precision is defined as (TP)/(TP+FP), recall as (TP)/(TP+FN), and an F1 score as (2*precision*recall)/(precision+ recall). The remaining 3 columns are thresh, ones_percent, and FPER. Thresh is the threshold value used for a model to obtain a 15% of target 1s. The ones_percent column may be calculated as 100*(TP+FP)/(TP+FP+FN+TN) and the FPER column may be calculated as 100*FP/(TP+FP). It may be observed the FPER continuously decreases as the number of target one binary values increases or as the sampling ratio increases. As a result, even though the F1 score for the fifth simulation (Sim 5) is the worst in the table, the FPER for a fixed ones_percent is the best.

Figure 8:
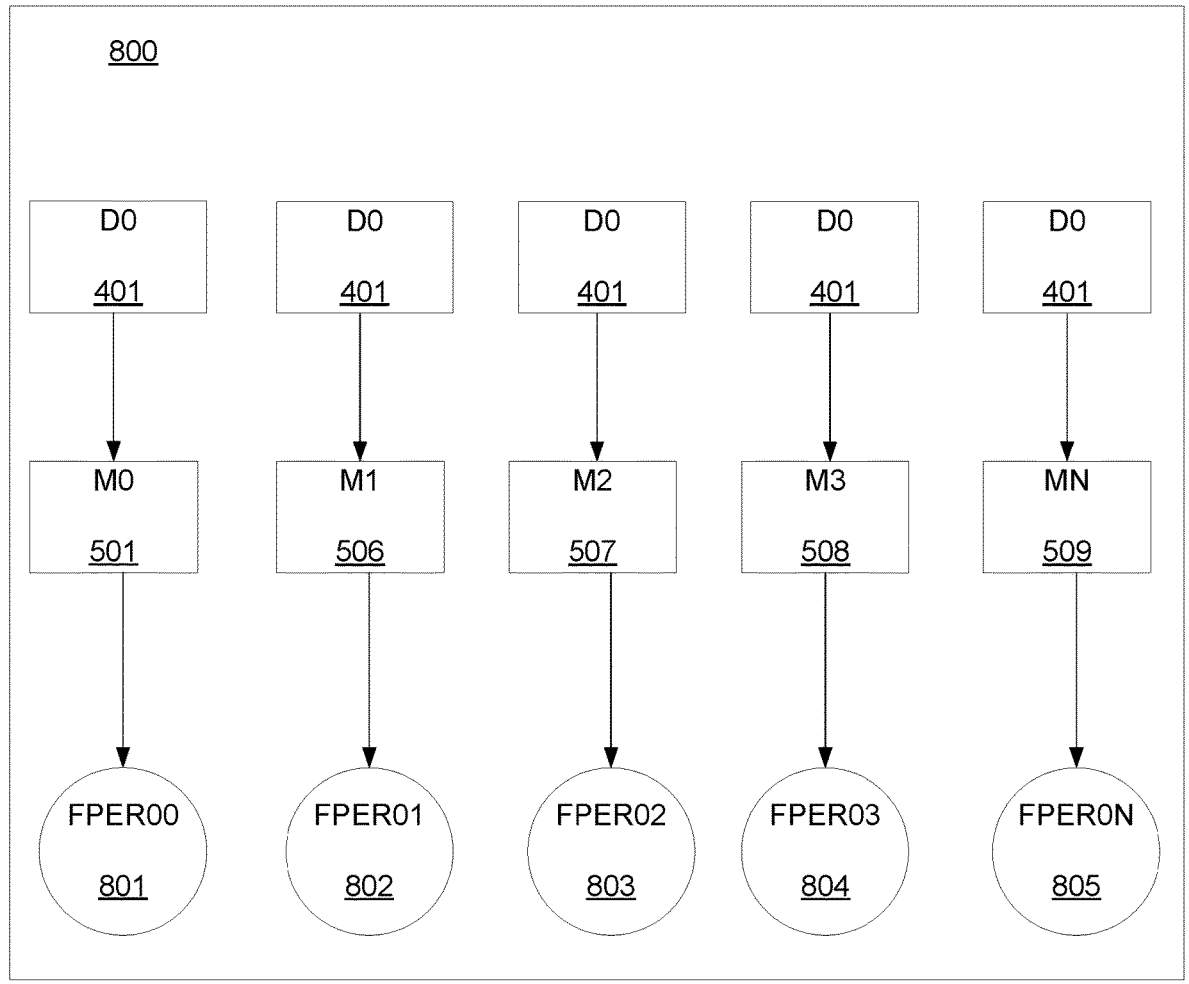
FIG. 8 illustrates an example schematic showing the FPERs for the base imbalanced data set applied to the plurality of models based on imbalanced data sets in accordance with one or more aspects described herein.

FIG. 8 illustrates an example schematic 800 showing the FPERs for the base imbalanced data set applied to the plurality of models. The base model M0 501 and the generated imbalanced models (M1 506, M2 507, M3 508, MN 509) may be tested by applying the base imbalanced data set D0 401 as an input and calculating a corresponding FPER (i.e. FPER00 801 for model M0 501, FPER01 802 for model M1 506, FPER02 803 for model M2 507, etc.).

FIG. 9 illustrates an example table diagram showing FPER simulation results based on the base imbalanced data set applied to the plurality of imbalanced models. The simulations shown in FIG. 9 were generated using historical data based on a base imbalanced data set corresponding to test values with a sampling ratio of 76/24. The base imbalanced data set (Data_76/24_test) was fed into the different models and the results are summarized in table diagram shown in FIG. 9. The simulations show that the FPER is lowest when Data_76/24_test is sent through Model_76/24. As a result, the 76/24 model may be considered a best model.

Figure 10:
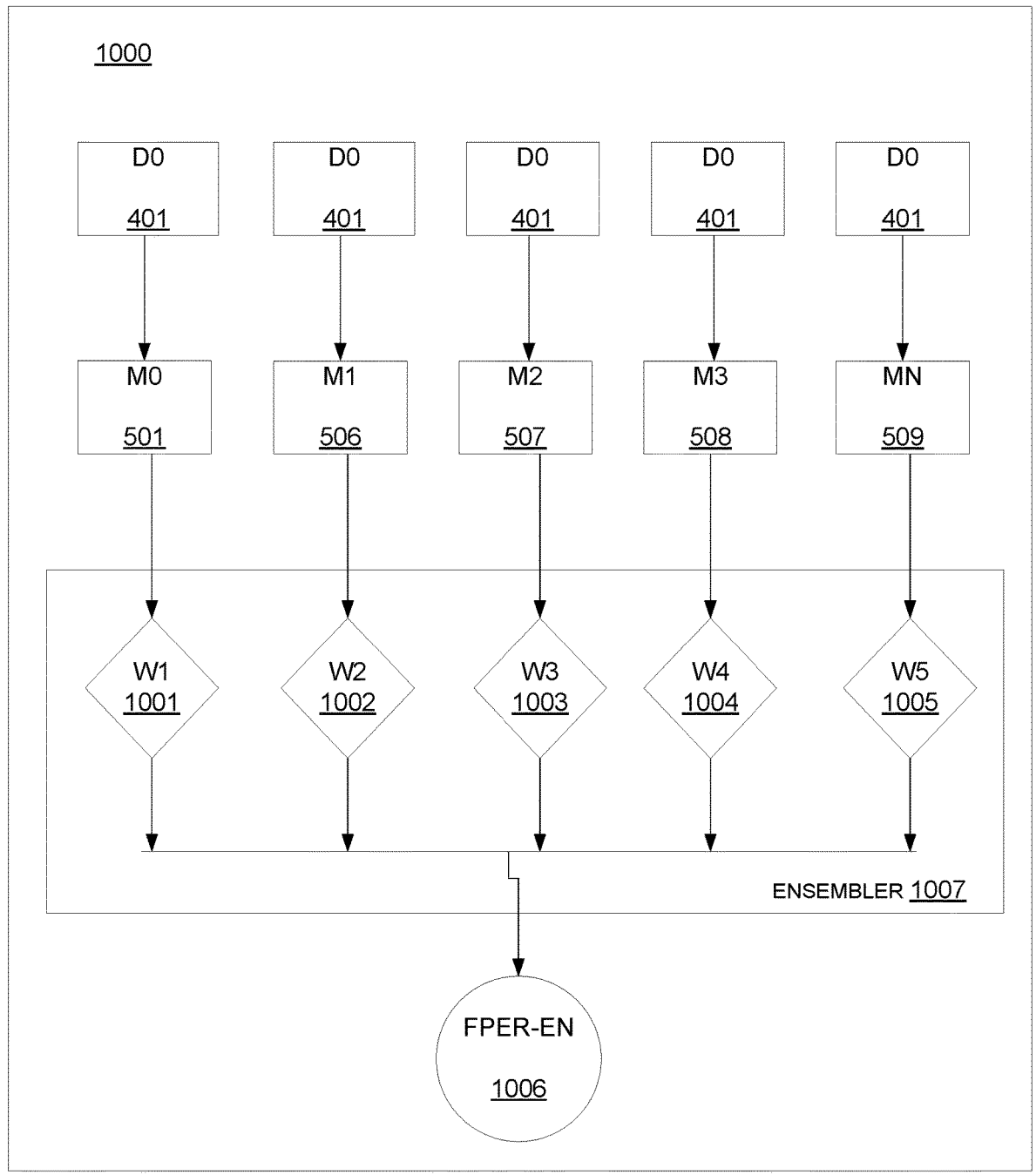
FIG. 10 illustrates an example schematic showing the FPER for the ensembled outputs of the plurality of models in accordance with one or more aspects described herein.

FIG. 10 illustrates an example schematic 1000 showing the FPER for the ensembled outputs of the plurality of imbalanced models. The output data sets generated by applying the base imbalanced data set D0 401 as an input to the imbalanced base model M0 501 and the generated imbalanced models (M1 506, M2 507, M3 508, MN 509) may be ensembled by an ensembler 1007 by applying weights to each output and combining the weighted output data sets algebraically to generate a single output data set. For example, weight w1 1001 may be applied to the output data set corresponding to model M0 501, weight w2 1002 may be applied to the output data set corresponding to model M1 506, weight w3 1003 may be applied to the output data set corresponding to model M2 507, etc. A corresponding ensembled FPER (FPER-EN) 1006 may be generated based on the ensemble output data set and a predefined data set with actual values.

FIG. 11 illustrates an example table diagram showing FPER simulation results based on the ensembled outputs of the plurality of models. In FIG. 9, a best model was identified based on simulation results corresponding to a minimum FPER value. In FIG. 11, the predictions from the plurality of imbalanced models are ensembled to help reduce the best FPER associated with the best model. A subset of the imbalanced models is selected in the ensembling process. The models used in the ensembling process have sampling ratios 70/30 (simulation 7 corresponding to "sim 7"), 76/24 (simulation 8 corresponding to "sim 8"), and 80/20 (simulation 9 corresponding to "sim 9"). The simulation uses soft prediction values (pred_76/24_test) from Sim 7, Sim 8, and Sim 9 using a simple weighted average with corresponding taps 0.25, 0.50, and 0.25. The results are shown in the column corresponding to Sim 11. It may be noted that the FPER of the weighted and ensembled imbalanced models (2.59%) is lower than the FPER of the selected best model, (2.66% as shown in FIG. 9). This reduction in FPER corresponds to an improvement by 2.53%.

Figure 12:
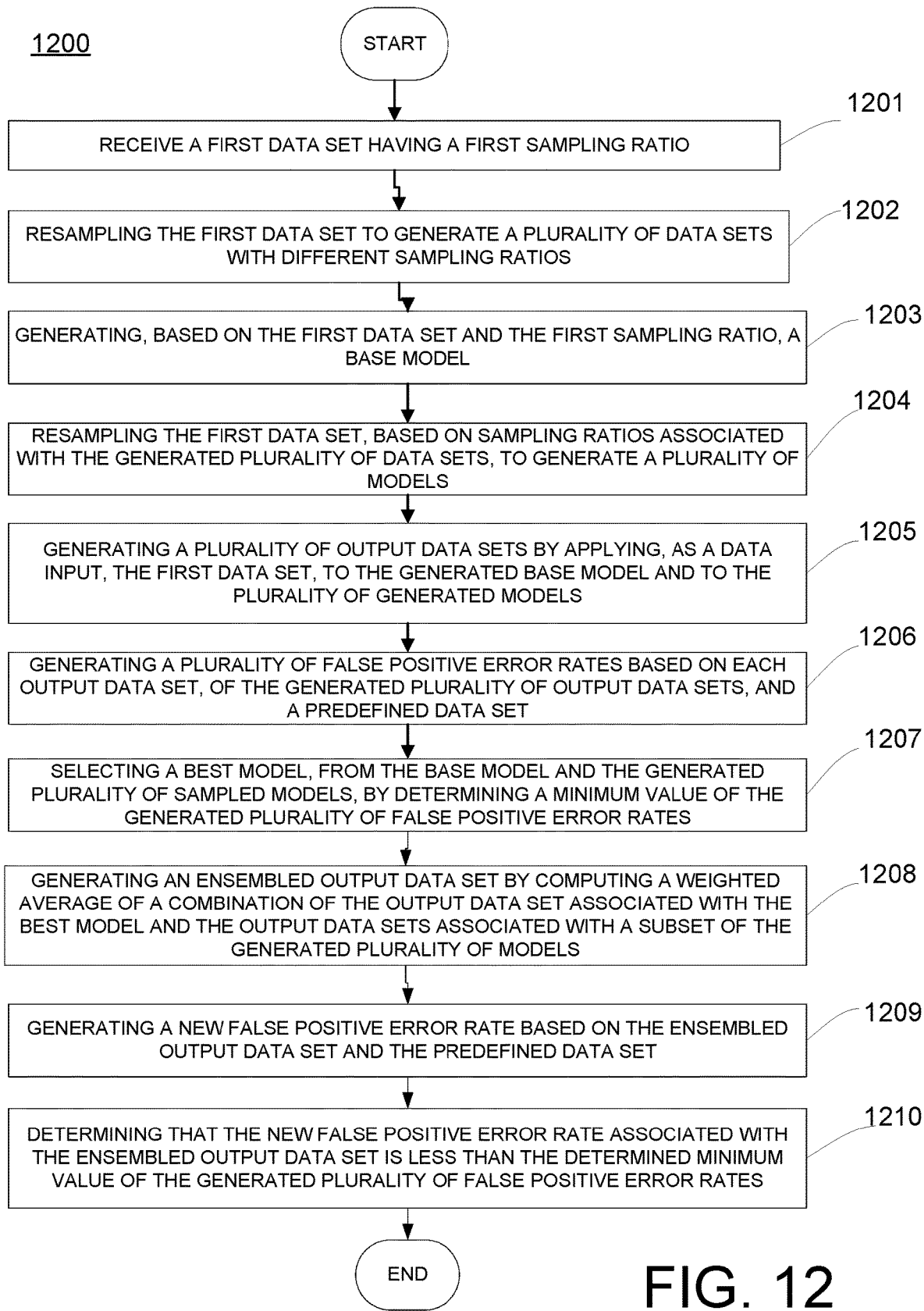
FIG. 12 illustrates a flow chart showing an example method for reducing FPERs based on a plurality of models generated based on imbalanced data in accordance with one or more aspects described herein.

FIG. 12 illustrates a flow chart showing an example method 1200 for reducing FPERs based on imbalanced data models by executing a set of instructions comprising the initial step of receiving a first data set having a first sampling ratio 1201. The received first data set may be an imbalanced data set that is used to build a predictive model. The first data set may comprise an uneven distribution of binary target values of ones and zeros representing the first sampling ratio. For example, the first data set may comprise an imbalanced binary distribution with 76% target one values and 24% target zero values as opposed to a balanced data set of 50% target one values and 50% target zero values.

The next steps involve resampling the first data set to generate a plurality of data sets with different sampling ratios 1202 and generating, based on the first data set and the first sampling ratio, a base model 1203. The next steps involve using the plurality of resampled data sets to create corresponding models 1204. and generating a plurality of output data sets 1205 by applying, as a data input, the first data set, to all the corresponding models.

The next steps involve generating a plurality of false positive error rates based on each output data set, of the generated plurality of output data sets, and a predefined data set 1206 and selecting a best model, from the base model and the generated plurality of models, by determining a minimum value of the generated plurality of false positive error rates 1207.

The next steps involve generating an ensembled output data set by computing a weighted average of a combination of the output data set associated with the best model and the output data sets associated with a subset of the generated plurality of models 1208 and generating a new false positive error rate based on the ensembled output data set and the predefined data set 1209.

The final step involves determining that the new false positive error rate associated with the ensembled output data set is less than the determined minimum value of the generated plurality of false positive error rates 1210.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention. For example, one of ordinary skill in the art will appreciate that the steps illustrated in the illustrative figures may be performed in other than the recited order, and that one or more steps illustrated may be optional in accordance with aspects of the disclosure. Further, one of ordinary skill in the art will appreciate that various aspects described with respect to a particular figure may be combined with one or more other aspects, in various combinations, without departing from the invention.

What is claimed is:

1. A method comprising: receiving, by a processor of a computing device, a first data set having a first sampling ratio, wherein the first sampling ratio comprises a ratio of positive target data points to negative target data points in the first data set, wherein the first data set comprises information that is indicative of fraud;

storing, by the processor of the computing device on a memory of the computing device, the first data set;

retrieving, by the processor of the computing device from the memory of the computing device, the first data set;

generating, by the processor of the computing device, a first model based on the first data set and the first sampling ratio, the first model configured to detect one or more instances of fraud;

applying as an input, by the processor of the computing device, the first data set to the first model;

generating, by the processor of the computing device, a first output data set based on the inputted first data set to the first model, the first output data set comprising one or more instances of fraud detected by the first model;

computing, by the processor of the computing device, a first false positive error rate based on the first output data set and a predefined data set, the first false positive error rate comprising a first rate at which fraud is incorrectly detected;

generating, by the processor of the computing device, a plurality of new data sets based on resampling the first data set, wherein each new data set of the plurality of new data sets has an associated sampling ratio that is unique:

with respect to the first sampling ratio of the first data set, and with respect to the sampling ratios of other new data sets of the plurality of new data sets;

generating, by the processor of the computing device, a plurality of new models based on each of the generated new data sets, each of the plurality of new models being configured to detect one or more instances of fraud;

applying as an input to the plurality of new models, by the processor of the computing device, each of the generated new data sets with the associated unique sampling ratio corresponding to each of the plurality of new models;

training, by the processor of the computing device, each of the plurality of new models, based on each of the inputted generated new data sets;

generating, by the processor of the computing device and based on training each of the plurality of new models, a plurality of output data sets, each output data set of the plurality of output data sets comprising one or more additional instances of fraud detected by a respective one of the plurality of new models;

generating, by the processor of the computing device, a plurality of new false positive error rates based on each of the generated plurality of output data sets and the predefined data set, wherein each of the generated plurality of new false positive error rates is determined by a respective sampling ratio, wherein each of the generated plurality of new false positive error rates comprises a respective rate at which fraud is incorrectly detected;

comparing, by the processor of the computing device, each of the generated plurality of new false positive error rates to the first false positive error rate;

determining, by the processor of the computing device, that a combination of the generated plurality of new false positive error rates varies depending on the generated plurality of output data sets and each corresponding new model of the plurality of new models; and identifying, by the processor of the computing device, from the first model and the plurality of new models, a best model for detecting fraud, the best model having a lowest relative false positive error rate at which fraud is incorrectly detected.

2. The method of claim 1, wherein the first data set is an imbalanced data set comprising a larger number of positive target data points relative to negative target data points.

3. The method of claim 1, wherein the first data set comprises test data.

4. The method of claim 1, wherein each model, of the plurality of new models, is generated based on imbalanced data.

5. The method of claim 4, wherein a particular sampling ratio associated with each model, of the plurality of new models, is different from the sampling ratio associated with the first data set.

6. The method of claim 1, wherein generating the plurality of models by resampling the generated first data set further comprises:
generating, by the processor of the computing device, a plurality of imbalanced training data sets by resampling a training data set and training each model, of the plurality of new models, using the generated plurality of imbalanced training data sets.

7. The method of claim 1, wherein generating the plurality of models by resampling further comprises downsampling.

8. The method of claim 1, wherein a subset of the plurality of output data sets comprises more than one output data set.

9. The method of claim 1, wherein a subset of the plurality of output data sets comprises one or more imbalanced output data sets.

10. The method of claim 1, wherein a subset of the plurality of output data sets is selected based on determining a plurality of false positive error rates associated with each model, of the plurality of new models.

11. The method of claim 1, wherein the first data set comprises binary values encoding either a positive data point or a negative data point.

12. The method of claim 1, wherein generating the plurality of models by resampling further comprises upsampling.

13. The method of claim 1, further comprising:
selecting, by the processor of the computing device, the identified best model for detecting fraud and having the lowest relative false positive error rate at which fraud is incorrectly detected; and
utilizing, by the processor of the computing device, the selected best model to detect at least one instance of fraud.

14. A method comprising: receiving, by a processor of a computing device, a first data set having a first sampling ratio, wherein the first data set comprises information that is indicative of fraud;
resampling, by the processor of the computing device, the first data set to generate a plurality of new data sets, wherein each new data set within the plurality of data sets has an associated sampling ratio that is unique:
with respect to the first sampling ratio of the first data set, and
with respect to the sampling ratios of other new data sets of the plurality of new data sets;
generating, by the processor of the computing device based on the first data set and the first sampling ratio, a base model, the base model configured to detect one or more instances of fraud;
resampling, by the processor of the computing device, the first data set, based on sampling ratios associated with each of the generated plurality of data sets, to generate a plurality of models, each of the generated plurality of models associated with a data set of the plurality of data sets, each of the generated plurality of models being configured to detect one or more instances of fraud;
applying as an input to each of the generated plurality of models and the base model, by the processor of the computing device, the first data set;
training, by the processor of the computing device, each of the generated plurality of models, based on each of the inputted first data set;
generating, by the processor of the computing device, a plurality of output data sets, a first output data set of the plurality of output data sets being based on the base model, each remaining output data set of the plurality of output data sets being based on a respective model of the generated plurality of models, the first output data set of the plurality of output data sets comprising one or more instances of fraud detected by the base model, each of the remaining output data sets of the plurality of output data sets comprising one or more additional instances of fraud detected by the respective model of the generated plurality of models;
generating, by the processor of the computing device, a plurality of false positive error rates based on each output data set, of the generated plurality of output data sets, and a predefined data set, wherein each of the generated plurality of false positive error rates is determined by a respective sampling ratio, wherein each of the generated plurality of false positive error rates comprises a respective rate at which fraud is incorrectly detected;
identifying, by the processor of the computing device, from the base model and the generated plurality of models a best model for detecting fraud, the best model having a lowest relative false positive error rate at which fraud is incorrectly detected;
generating, by the processor of the computing device, an ensembled output data set by algebraically computing a weighted average of a combination of the output data set associated with the best model and the output data sets associated with a subset of the generated plurality of models; and
generating, by the processor of the computing device, a new false positive error rate based on the ensembled output data set and the predefined data set, wherein the new false positive error rate comprises a new rate at which fraud is incorrectly detected.

15. The method of claim 14, wherein the first data set is an imbalanced data set comprising a majority of positive target data points.

16. The method of claim 14, wherein the base model and each generated model, of the generated plurality of models, is based on imbalanced data.

17. The method of claim 14, wherein algebraically computing the weighted average of the combination of the output data set associated with the best model and the output data sets associated with a subset of the generated plurality of models sets further comprises:
generating, by the processor of the computing device, a plurality of weights, wherein the weights applied to the first output data set and the subset of the generated plurality of models sets can be dynamically selected from a predefined list.

18. The method of claim 14, further comprising determining whether the new false positive error rate associated with the ensemble output data set is less than the determined minimum false positive error rate of the generated plurality of false positive error rates.

19. The method of claim 14, wherein the false positive error is determined by a relationship between a number of false positives and a number of true positives.

20. A system comprising:
one or more processors; and
memory storing computer-executable instructions that, when executed by the one or more processors, cause the system to perform machine learning operations comprising:
receive, by a processor of a computing device, a first data set having a first sampling ratio, wherein the first data set comprises information that is indicative of fraud;
generate, by the processor of the computing device, a first model based on the first data set and the first sampling ratio, the first model configured to detect one or more instances of fraud;
apply as an input, by the processor of the computing device, the first data set to the first model;
generate, by the processor of the computing device, a first output data set based on the inputted first data set to the first model, the first output data set comprising one or more instances of fraud detected by the first model;
compute, by the processor of the computing device, a first false positive error rate based on the first output data set and a predefined data set, the first false positive error rate comprising a first rate at which fraud is incorrectly detected;
resample, by the processor of the computing device, the first data set to generate a plurality of data sets, wherein each new data set of the plurality of new data sets has an associated sampling ratio that is unique:
with respect to the first sampling ratio of the first data set of the first data set, and
with respect to the sampling ratios of other new data sets of the plurality of new data sets;
generate, by the processor of the computing device, a plurality of models, wherein each of the generated plurality of models is based on a corresponding generated data set from the plurality of data sets;
apply as an input to the generated plurality of models, by the processor of the computing device, each of the generated new data sets with the associated unique sampling ratio corresponding to each of the generated plurality of models;
train, by the processor of the computing device, each of the generated plurality of models, based on each of the inputted generated new data sets;
generate, by the processor of the computing device, a plurality of output data sets based on each of the generated plurality of models, each of the plurality of output data sets comprising one or more additional instances of fraud detected by a respective new model of the generated plurality of new models;
generate, by the processor of the computing device, a combined output data set by algebraically computing a weighted average of a combination of the first output data set and a subset of the plurality of output data sets;
compute, by the processor of the computing device, a second false positive error rate based on the combined output data set and the predefined data set, the second false positive error rate comprising a second rate at which fraud is incorrectly detected, wherein each of the first false positive error rate and the second false positive error rate is determined by a respective sampling ratio;
determine, by the processor of the computing device, that the second false positive error rate is less than the first false positive error rate; and
based on determining that the second false positive error rate is less than the first false positive error rate, identify, by the processor of the computing device, a best model for detecting fraud.

21. The system of claim 20, wherein computing a weighted average of a combination of the first output data set and a subset of the plurality of output data sets comprises:
generating, by the processor of the computing device, a plurality of weights, wherein a first weight applied to the first output data set is different from a second weight applied to the subset of the plurality of output data sets.

22. The system of claim 20, wherein computing a weighted average of a combination of the first output data set and a subset of the plurality of output data sets further comprises:
generating, by the processor of the computing device, a plurality of weights, wherein a first weight applied to the first output data set is a multiple of a second weight applied to the subset of the plurality of output data sets.

23. The system of claim 20, wherein the first data set is an imbalanced data set comprising a majority of positive target data points with a fraction of negative target data points.

24. The system of claim 20, wherein the memory stores additional computer-executable instructions, which when executed by the one or more processors, cause the system to:
compute, by the processor of the computing device, the weighted average of a combination of the first output data set and a subset of the plurality of output data sets by generating a plurality of weights, wherein the weights applied to the first output data set and the subset of the plurality of output data sets can be dynamically selected from a predefined list.

* * * * *